United States Patent
Hayashi et al.

(10) Patent No.: US 7,853,278 B2
(45) Date of Patent: Dec. 14, 2010

(54) COMMUNICATION CONTROL SERVER, COMMUNICATION TERMINAL AND COMMUNICATION CONTROL METHOD

(75) Inventors: Yosuke Hayashi, Yokosuka (JP); Mutsumaru Miki, Saitama (JP); Naomasa Yoshida, Yokohama (JP)

(73) Assignee: NTT DoCoMo, Inc., Chiyoda-ku (JP)

( * ) Notice: Subject to any disclaimer, the term of this patent is extended or adjusted under 35 U.S.C. 154(b) by 909 days.

(21) Appl. No.: 11/438,220

(22) Filed: May 23, 2006

(65) Prior Publication Data

US 2006/0281481 A1 Dec. 14, 2006

(30) Foreign Application Priority Data

Jun. 10, 2005 (JP) ............................. 2005-171161

(51) Int. Cl.
*H04B 7/00* (2006.01)
(52) U.S. Cl. ...................................... 455/518; 455/519
(58) Field of Classification Search ................ 455/414, 455/426, 416, 517–520, 509; 370/395.2, 370/259–261, 338, 401, 342, 441
See application file for complete search history.

(56) References Cited

U.S. PATENT DOCUMENTS

| 6,026,296 | A | 2/2000 | Sanders, III et al. | |
| 6,564,049 | B1 | 5/2003 | Dailey | |
| 6,898,436 | B2 * | 5/2005 | Crockett et al. | 455/518 |
| 7,231,223 | B2 * | 6/2007 | May et al. | 455/519 |
| 2004/0171400 | A1 | 9/2004 | Rosen et al. | |
| 2005/0265350 | A1 * | 12/2005 | Narasimha et al. | 370/395.2 |

FOREIGN PATENT DOCUMENTS

| JP | 2004-289841 A | 10/2004 |
| WO | WO 2004/062306 A1 | 7/2004 |
| WO | WO 2004/075575 A2 | 9/2004 |
| WO | WO 2005/120104 A1 | 12/2005 |

OTHER PUBLICATIONS

Japanese Office Action dated Oct. 30, 2007 with English Translation (Seven (7) pages).
*Push to Talk Over Cellular (PoC) Charter*, Open Mobile Alliance, OMA-CHARTER_PoC-V1_0-20031014-A, Oct. 14, 2003, pp. 1-3.

(Continued)

*Primary Examiner*—Matthew D Anderson
*Assistant Examiner*—Gennadiy Tsvey
(74) *Attorney, Agent, or Firm*—Crowell & Moring LLP (57) ABSTRACT

Time required before PoC communication starts, in the case where a communication channel on the destination side has not been established, is shortened, and convenience of users is enhanced. A request for establishing a communication channel used for PoC communication is sent from a terminal TA. Immediately after receiving this request, call processing for establishing a communication channel to a terminal TC other than the terminal TA is started. In parallel with this call processing, processing after sending a response to the request is performed. Thereby, response to a communication channel connection request, SIP Registration processing and Invitation processing on the originating side and the processing on the destination side are performed in parallel, so that connection time can be shortened, and PoC communication can be started early.

4 Claims, 7 Drawing Sheets

OTHER PUBLICATIONS

*Push to Talk over Cellular Requirements*, Open Mobile Alliance, OMA-RD_PoC-V1_0-20041115-C, Version 1.0, Nov. 15, 2004, pp. 1-76.

Universal Mobile Telecommunications System (UMTS); 3GPP enablers for Open Mobile Alliance (OMA) Push-to-talk over Cellular (PoC) services; Stage 2 (3GPP Tr 23.979 version 6.1.0 Release 6)., ETSI TR 123 979 V6.1.0 (Mar. 2005). XP014027165.

European Search Report dated Sep. 4, 2006 (ten (10) pages).

* cited by examiner

PRIOR ART

F I G. 6

PRIOR ART

*FIG. 7*

PRIOR ART

*FIG. 8*

PRIOR ART

FIG. 9

PRIOR ART

FIG. 10

PRIOR ART

*FIG. 11*

PRIOR ART

*FIG. 12*

PRIOR ART

COMMUNICATION CONTROL SERVER, COMMUNICATION TERMINAL AND COMMUNICATION CONTROL METHOD

BACKGROUND OF THE INVENTION

1. Field of the Invention

The present invention relates to a communication control server, a communication terminal and a communication control method, and in particular to a communication control server for providing a SIP session using a packet connection communication channel in a mobile communication network, a communication terminal and a communication control method.

2. Description of the Related Art

Realization of PoC (Push-to-Talk over Cellular) communication is scheduled which makes it possible to use a mobile terminal device, such as a cellular phone, like a transceiver and realize communication among multiple users in a group only by touching a button.

PoC communication is quick communication means to be used between two users or in a group, and it is possible to use a terminal device like a transceiver in the PoC communication. The operation for starting conversation is performed not by pressing dial buttons but by simply pressing a particular button.

Currently, PoC communication is standardized (OMA-RD_PoC-V1_0-20041115-C) based on the PoC Charter (OMA-CHARTER_PoC-V_0-20031014-A) by the OMA (Open Mobile Alliance), an industry organization which promotes standardization of mobile application techniques.

In order to perform PoC communication, it is the premise that a communication channel has been already formed. Following a Registration message and an INVITE message by SIP (Session Initiation Protocol), acquisition of the right to speak by RTP (Real Time Protocol) is performed.

Description will be made on processings from starting PoC communication when a communication channel has not been formed yet to ending the PoC communication, with reference to FIGS. 5 to 10. In the figures, there are shown three terminals TA, TB and TC which are provided with a PoC communication function and a PoC server 100 which controls a PoC communication service.

(Formation of a Communication Channel)

Figure 6:
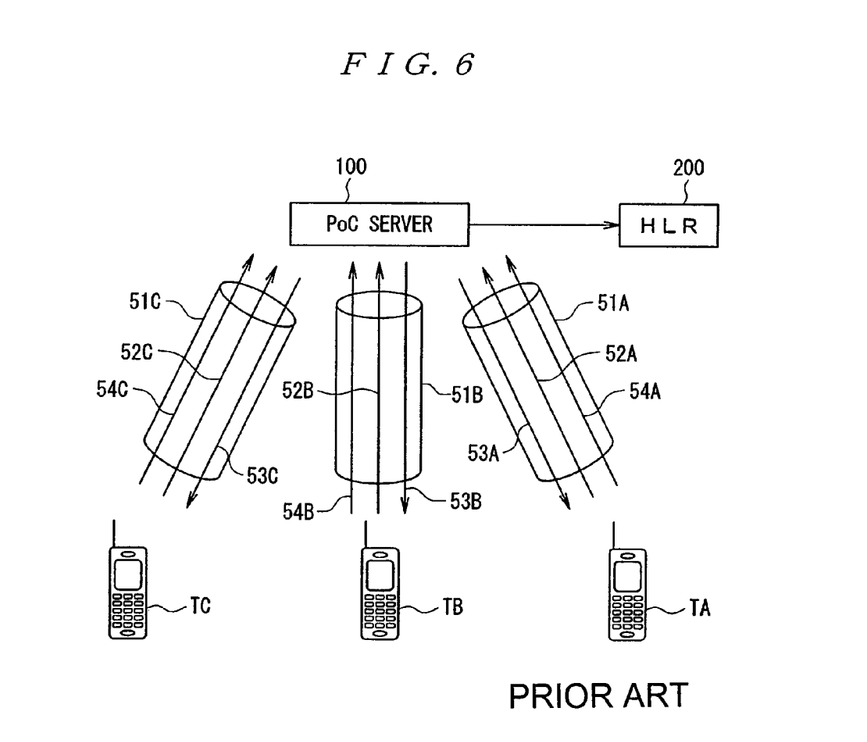
FIG. 6 is a diagram showing the condition of Registration processing.

In order to perform PoC communication, it is necessary that a communication channel have been formed as a premise. To form a communication channel, communication channel establishment request signals 50A, 50B and 50C are sent by the respective terminals to the PoC server 100. Thereby, receiving the communication channel establishment request signals 50A, 50B and 50C, the PoC server 100 forms communications channels 51A, 51B and 51C between the respective terminals and itself, as shown in FIG. 6. These communication channels 51A, 51B and 51C are communication channels enabling packet communication, such as a GPRS (General Packet Radio Service) network and a WLAN (Wireless Local Area Network). The PoC server performs position registration processing and the like for the terminals against a subscriber information management server (Home Location Register Server) 200.

(Registration Processing and Invitation Processing)

After the communication channels 51A, 51B and 51C are formed by the above processing, Registration processing is performed. In this example, the Registration processing is performed by the terminal TA of a user A, and a PoC conversation group consisted of the three users A, B and C is specified. In the Registration processing, REGISTER messages 52A, 52B and 52C are sent by the terminal TA of the user A, the terminal TB of the user B and the terminal TC of the user C, respectively. When 200 Ok signals 54A, 54B and 54C are sent after response signals 53A, 53B and 53C from the PoC server to the sent REGISTER message are received, respectively, the Registration processing is completed.

Figure 7:
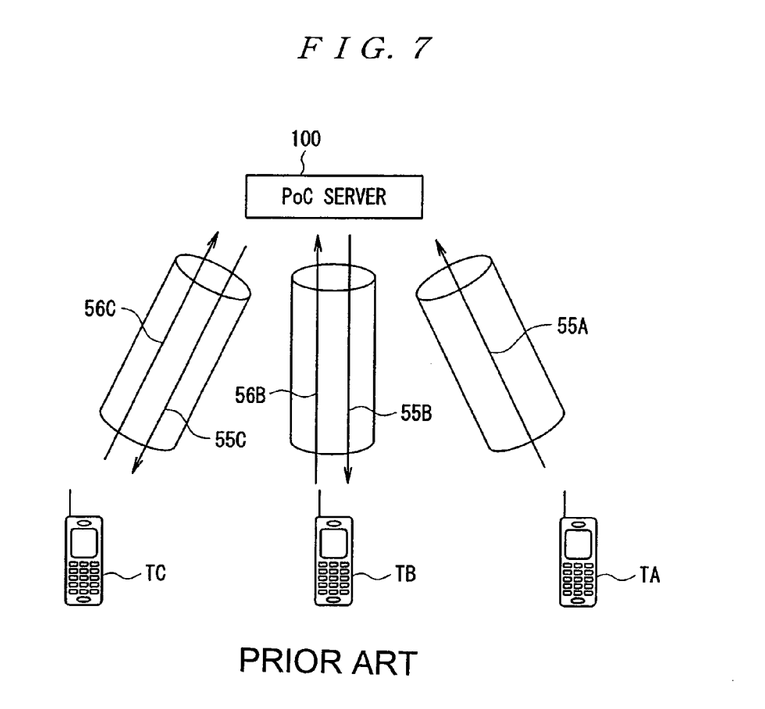
FIG. 7 is a diagram showing the condition of Invitation processing.

After the Registration processing, the process proceeds to Invitation processing. In the Invitation processing, an INVITE message 55A is sent from the terminal TA of the user A to the terminal TB of the user B and the terminal TC of the user C in the same PoC conversation group, as shown in FIG. 7. This INVITE message includes destination information (information for identifying the terminal TB of the user B and the terminal TC of the user C), transmission source information (information for identifying the terminal TA of the user A), a call identifier (such as a Call-ID), a header portion configured by a transmission route and the like, and a body portion configured by detailed information about the medium (classification whether voice or picture, band and the like).

If the terminals TB and TC of the user B and the user C are set to an automatic mode when they receive the INVITE messages 55B and 55C sent via the PoC server 100, then 200 OK signals 56B and 56C are automatically sent, and PoC communication is enabled. On the other hand, if the terminals TB and TC are set to a manual mode, then a 180 ringing signal is automatically sent first (not shown). Furthermore, by performing an operation such as pressing a button, the 200 OK signals 56B and 56C are outputted, and thereby, PoC communication is enabled.

When, while only the terminal TA of the user A and the terminal TB of the user B are performing PoC communication with each other, an operation such as pressing a button is performed on the terminal TC of the user C in the same PoC conversation group, a 200 OK signal is outputted, and PoC communication by the three users A, B and C is enabled. That is, any member in the same PoC conversation group can join PoC communication later by performing an operation such as pressing a button.

In order to disconnect PoC communication, a BYE message is sent from a terminal to the PoC server. Thereby, the terminal leaves the PoC conversation group which it has joined.

The above processing is performed in accordance with SIP (Session Initiation Protocol) provided in the specification RFC3261 by the IETF (Internet Engineering Task Force).

(Acquisition of the Right to Speak)

In PoC communication, a user cannot speak without acquiring the right to speak. That is, a user can be a speaker only when he has the right to speak. He is a listener when he does not have the right to speak.

Figure 8:
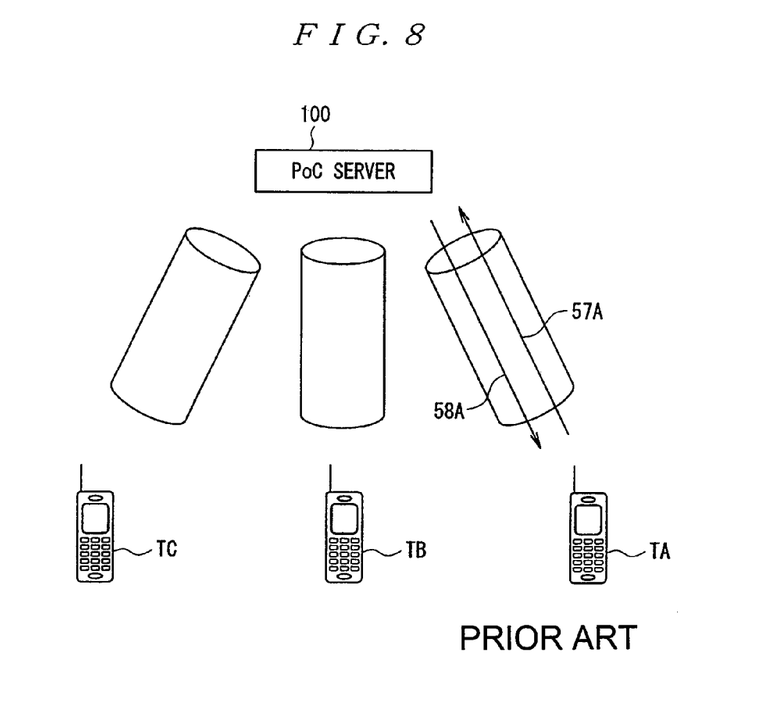
FIG. 8 is a diagram showing processing for acquiring the right to speak when PoC communication is being performed.

In order to acquire the right to speak when PoC communication is being performed, it is necessary to send and receive signals in accordance with RTP (Real-time Transport Protocol) and send a Floor Request signal. Here, as shown in FIG. 8, a floor request signal 57A is sent from the terminal TA of the user A. If the PoC server which has received the floor request signal 57A permits the right to speak, it returns a Floor Grant signal 58A to the terminal TA of the user A. The floor grant signal 58A includes identification information about the terminal to which the right to speak is permitted, information indicating the time of permission, and the like.

Figure 9:
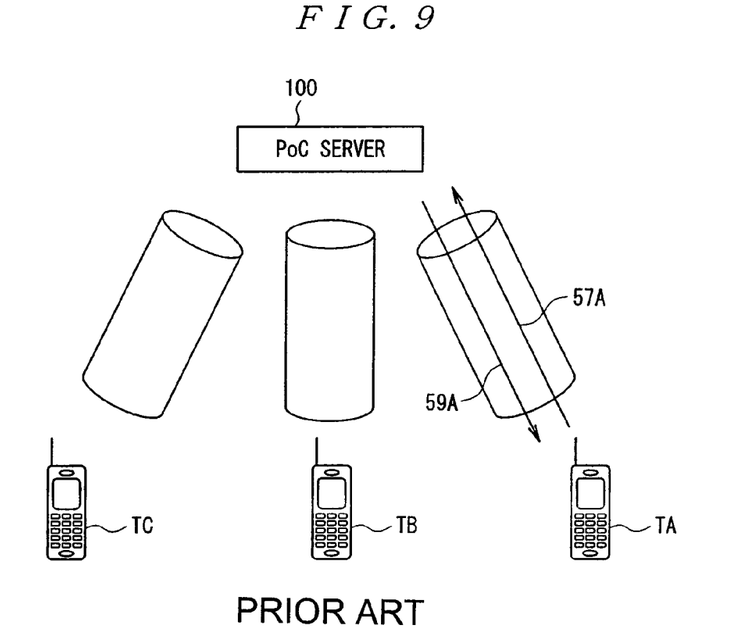
FIG. 9 is a diagram showing processing performed in the case where the right to speak cannot be acquired when PoC communication is being performed.

On the other hand, if the PoC server which has received the floor request signal 57A does not permit the right to speak, it returns a Floor Deny signal 59A, as shown in FIG. 9. This floor deny signal 59A includes identification information about the terminal to which the right to speak is not permitted, identification information about the terminal which currently has the right to speak, information about the time of permission, and the like.

Figure 10:
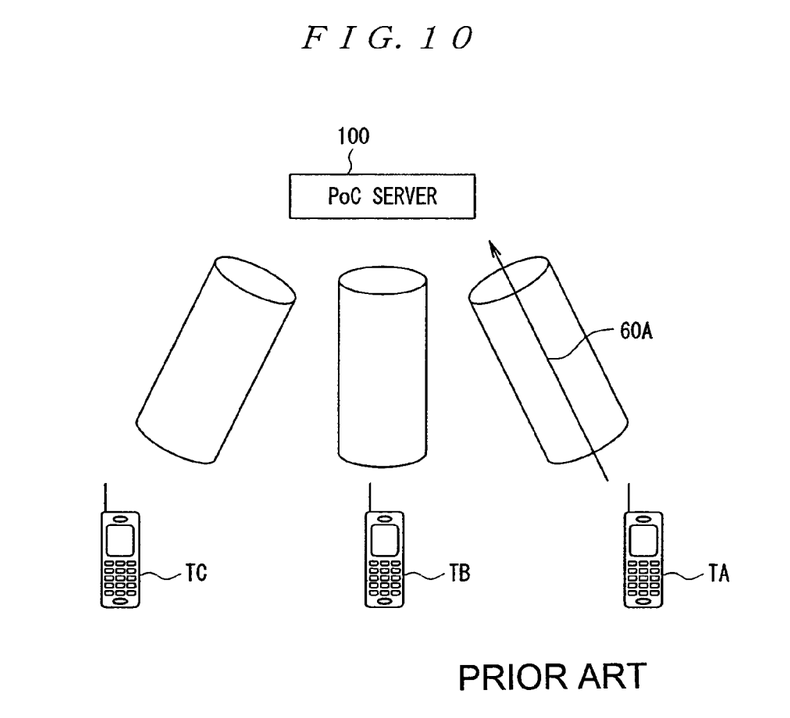
FIG. 10 is a diagram showing processing performed in the case of releasing the right to speak when PoC communication is being performed.

By making a speech while pressing a button, in the terminal which has the right to speak, the voice is sent to other terminals in the same PoC conversation group as packet data, and it is possible to speak in the group. The right to speak is held while the button is pressed. If the finger leaves the button and stops pressing it, the right to speak is lost. In this case, when pressing the button is stopped, a Floor Release signal 60A is sent from the terminal to the PoC server as shown in FIG. 10, and a state is caused in which no terminal has the right to speak (Floor Idle).

In addition to releasing the right to speak by releasing a button from the condition of being pressed as described above, the right to speak may be released by time-out of a timer.

Figure 11:
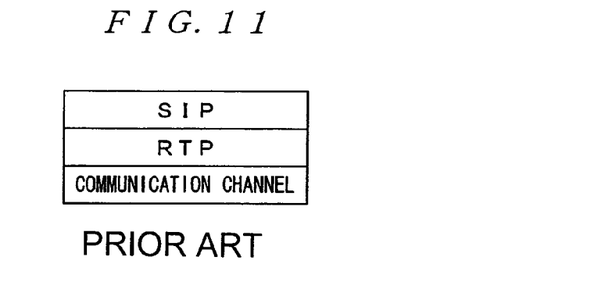
FIG. 11 is a diagram showing the hierarchical structure of a protocol used in the PoC communication system.

The protocol for performing the PoC communication described above has a hierarchical structure. That is, as shown in FIG. 11, the protocol has a structure in which RTP is located above a communication channel, and SIP is located above RTP.

As described above, in PoC communication, SIP communication after establishment of a communication channel is specified. Therefore, in the case where a communication channel has not been established, Registration processing is performed after establishing a communication channel on the originating side, and after that, SIP transmission processing such as the Invitation processing is performed. Then, if a communication channel on the destination side has not been established, it is necessary, as the processing on the destination side, to establish a communication channel by Push using a control signal, then perform the Registration processing, and then continue SIP call processing.

Figure 12:
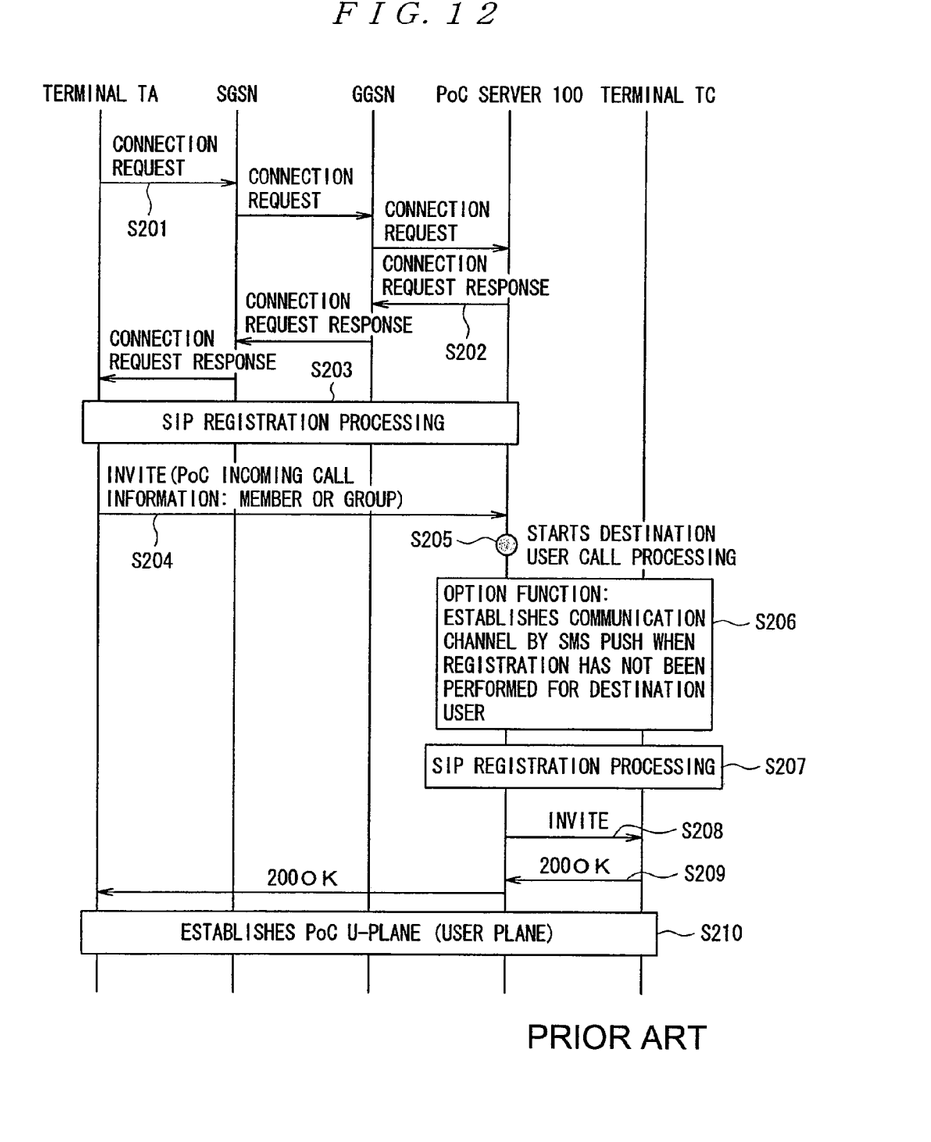
FIG. 12 is a sequence diagram showing the operation of an entire conventional PoC communication system.

That is, in the case where the terminal TA performs the INVITE processing against the terminal TC, a connection request S201 sent from the terminal TA is sent to the PoC sever 100 via an SGSN (Serving GPRS Support Node) and a GGSN (Gateway GPRS Support Node), as shown in FIG. 12. After a response S202 to the connection request is returned to the terminal TA via the GGSN and the SGSN, Registration processing S203 is performed.

After that, an INVITE message S204 is sent from the terminal TA. In this INVITE message S204, the name of the member or group to perform PoC communication is specified as PoC incoming call information.

Receiving this INVITE message S204, the PoC server 100 starts destination user call processing against the terminal TC which is a destination user (S205). Thereby, as an option function, communication channel establishment processing by SMS Push, which is an operation for sending and receiving a short message, is performed if the Registration processing on the destination user side has not been performed yet (S206); Then, Registration processing S207 is performed for the terminal TC, and an INVITE message S208 is sent to the terminal TC after the Registration processing S207 is completed.

Receiving the INVITE message, the terminal TC sends a 200 Ok signal S209. By this 200 Ok signal S209 being sent to the terminal TA, PoC U-Plane (User Plane) is established between the terminal TA and the terminal TC (S210).

An SGSN is one of nodes constituting a packet network, which is provided to connect to a wireless access network in a GPRS environment. A GGSN is one of nodes constituting a packet network, which is to be connected to an ISP (Internet Service Provider) or company network provided to connect to the Internet in a GPRS environment.

As described above, since it is necessary to perform the Registration processing after establishing a communication channel, there is a disadvantage that it takes a lot of time before communication starts if a communication channel on the destination side has not been established, and the convenience of users is decreased.

The present invention has been made to solve the above problem of the conventional technique, and its object is to provide a communication control server capable of, in the case where a communication channel on the destination side has not been established, shortening the time required before communication starts and preventing the convenience of users from being decreased, a communication terminal and a communication control method.

SUMMARY OF THE INVENTION

The communication control server according to claim 1 of the present invention is characterized in that it comprises receiving means for receiving a request for establishing a communication channel to be used for predetermined communication and call processing means for performing call processing for establishing a communication channel to a terminal other than the terminal which has sent the request immediately after the request is received by the receiving means, and that processing after sending a response to the request is performed, in parallel with the call processing. According to such configuration, response to a communication channel connection request, SIP Registration processing and Invitation processing on the originating side and the processing on the destination side are performed in parallel, and thereby, connection time can be shortened, and PoC communication can be started early.

The communication control server according to claim 2 of the present invention is the communication control server according to claim 1 characterized in that the request includes message information for starting communication with another terminal, and the call processing means performs the call processing using this information. According to such configuration, the call processing can be performed with the use of the address of another terminal, which is added to an INVITE message, and thereby, connection time can be shortened, and PoC communication can be started early.

The communication terminal according to claim 3 of the present invention is a communication terminal which sends a request for establishing a communication channel to be used for predetermined communication, the communication terminal being characterized in comprising sending means for sending the address of another terminal which is added to a message for starting communication with that other terminal by including the address in the request. According to such configuration, it is possible to perform the call processing with the use of the address of another terminal, which is added to an INVITE message, in a device which has received the request, and thereby, connection time can be shortened, and PoC communication can be started early.

The communication control method according to claim 4 of the present invention is characterized in comprising a communication channel establishment request sending step of sending a request for establishing a communication channel to be used for predetermined communication, a call processing step of performing call processing for establishing a communication channel to a terminal other than the terminal which has sent the request immediately after the request is received, and a step of performing processing after sending a response to the request, in parallel with the call processing step. Thus, response to a communication channel connection request, the SIP Registration processing and the Invitation processing on the originating side and the processing on the destination side are performed in parallel, and thereby, connection time can be shortened, and PoC communication can be started early.

As described above, according to the present invention, response to a communication channel connection request, the SIP Registration processing and the Invitation processing on the originating side and the processing on the destination side are performed in parallel, and thereby an advantage is obtained that connection time can be shortened and PoC communication can be started early.

DETAILED DESCRIPTION OF THE PREFERRED EMBODIMENTS

An embodiment of the present invention will be described below with reference to drawings. In each of figures referred to in the description below, the portions similar to those in the other figures are denoted by the same reference numerals.

(Configuration of a Communication Terminal)

Figure 2:
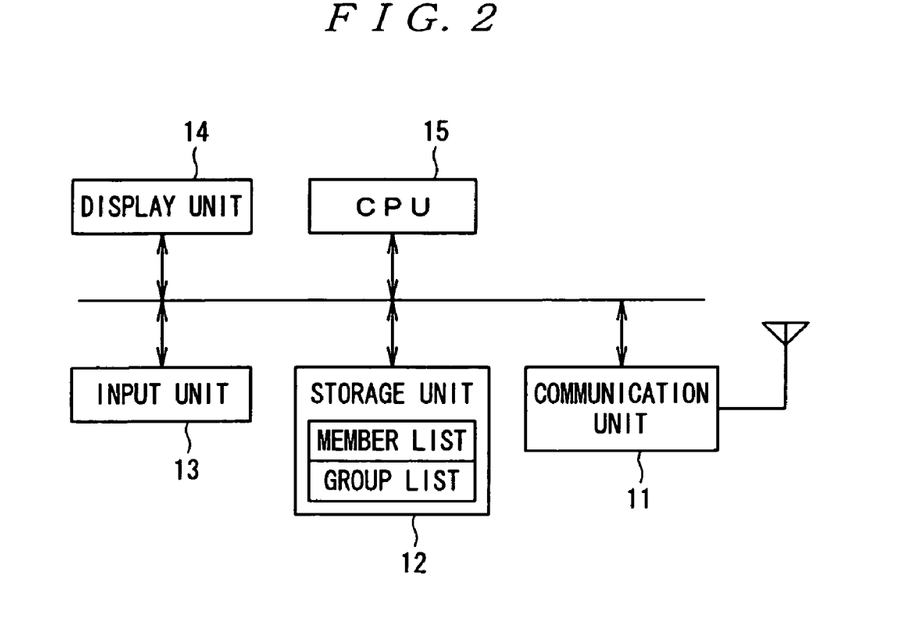
FIG. 2 is a block diagram showing an example of the configuration of a PoC terminal according to the embodiment of the present invention.

FIG. 2 is a block diagram showing an example of the configuration of a communication terminal according to this embodiment. In the figure, the communication terminal according to this embodiment is a PoC terminal, which is configured to include a communication unit 11 for communicating with an external device such as a PoC server, a storage unit 12 for storing various information, an input unit 13 for inputting various information, a display unit 14 for displaying various information and a CPU (Central Processing Unit) 15 for controlling each unit.

In the storage unit 12, there is stored a member list which is a list of members for performing PoC communication or a group list which is a list of a group, for example.

The input unit 13 includes an operation button used to perform PoC communication.

(Configuration of a Communication Control Server)

Figure 3:
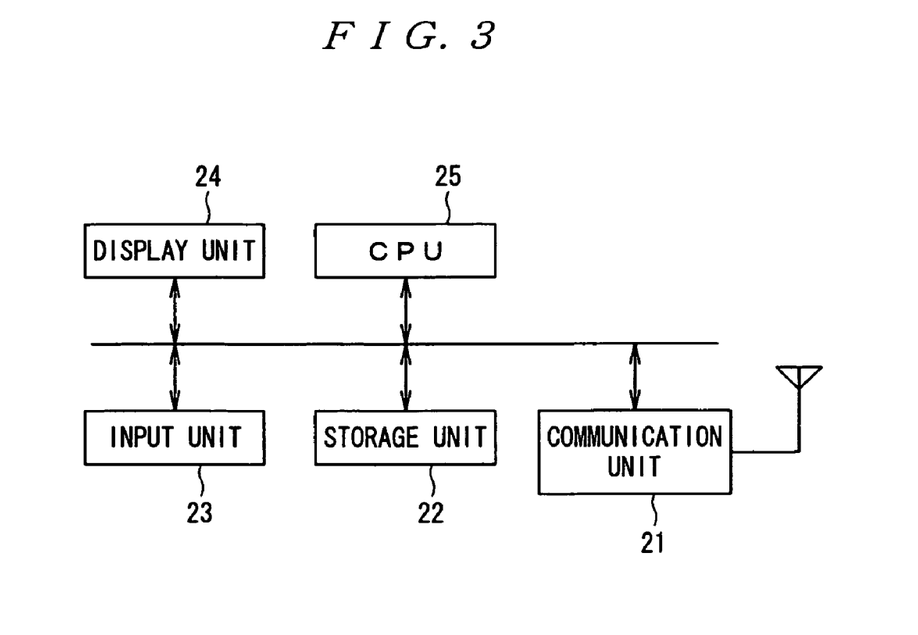
FIG. 3 is a block diagram showing an example of the configuration of a PoC server according to the embodiment of the present invention.

FIG. 3 is a block diagram showing an example of the configuration of a communication control server. In the figure, the communication control server according to this embodiment is a PoC server and is configured to include a communication unit 21 for performing communication with an external device such as a PoC terminal, a storage unit 22 for storing various information, an input unit 23 for inputting various information, a display unit 24 for displaying various information and a CPU 25 for controlling each unit.

(Operation of a Communication Control Server)

Figure 4:
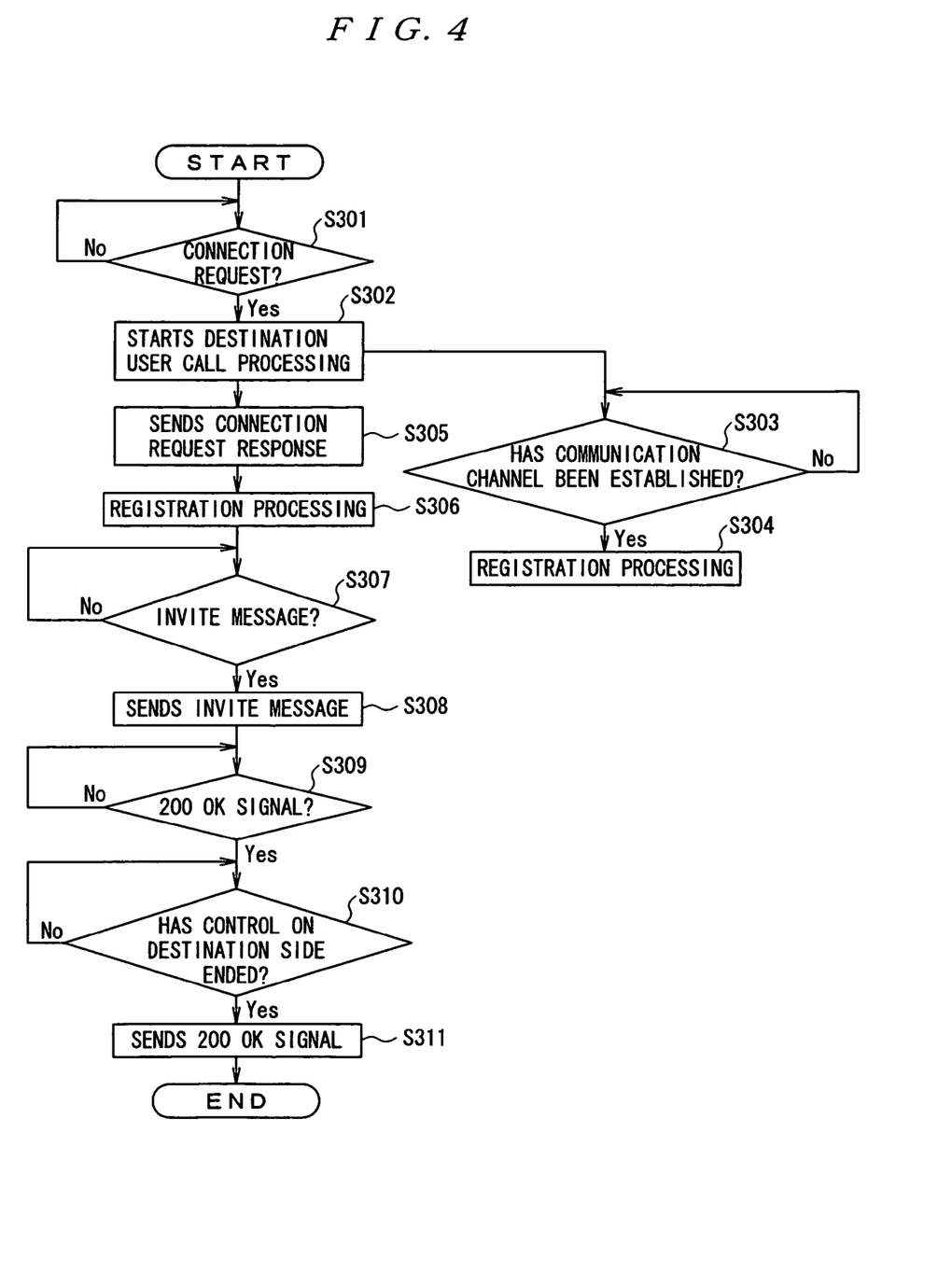
FIG. 4 is a flowchart showing the operation of the PoC server according to the embodiment of the present invention.
Figure 5:
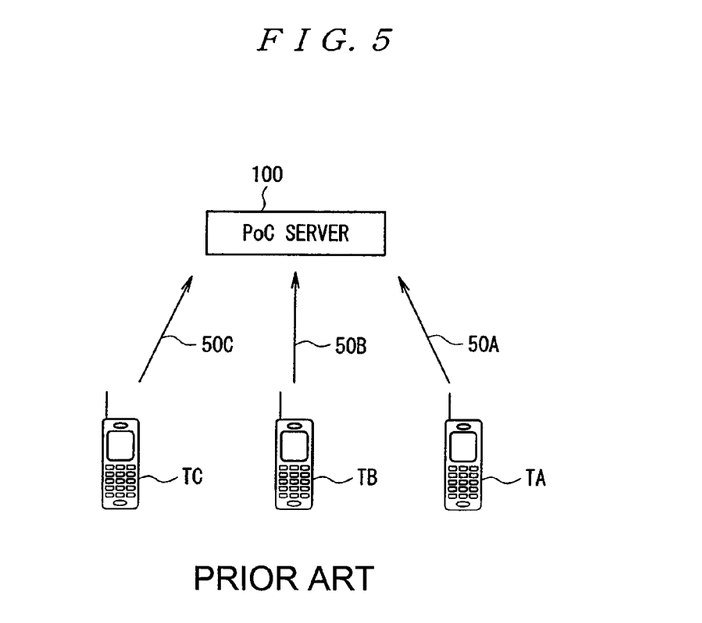
FIG. 5 is a diagram showing processing performed in the case where PoC communication is started when a communication channel has not been formed.

FIG. 4 is a flowchart showing the operation of the PoC server shown in FIG. 3. In the figure, the PoC server is in a waiting state until connection is requested by a terminal of an originating user (for example a terminal TA) (step S301). When connection is requested, destination user call processing is started (step S302), and processing for establishing a communication channel to the terminal of the destination user (for example, a terminal TC) is performed.

When a communication channel to the terminal of the destination user is established, the PoC server performs Registration processing (step S303→step S304).

The PoC server also performs the following processing in parallel with steps S303 and S304. That is, the PoC server sends a connection request response to the terminal of the originating user (step S305) and performs the Registration processing (step S306).

After that, the PoC server is in a waiting state until an INVITE message is sent from the terminal of the originating user (step S307). If receiving an INVITE message, the PoC server sends the INVITE message to the terminal of the destination user (step S307→step S308).

After that, the PoC server is in a waiting state until it receives a 200 OK signal from the terminal of the destination user (step S309). If receiving a 200 OK signal, the PoC server sends the 200 OK signal to the terminal of the originating user only when control on the destination side has been completed (step S301→step S311).

(Operation of the Entire System)

Figure 1:
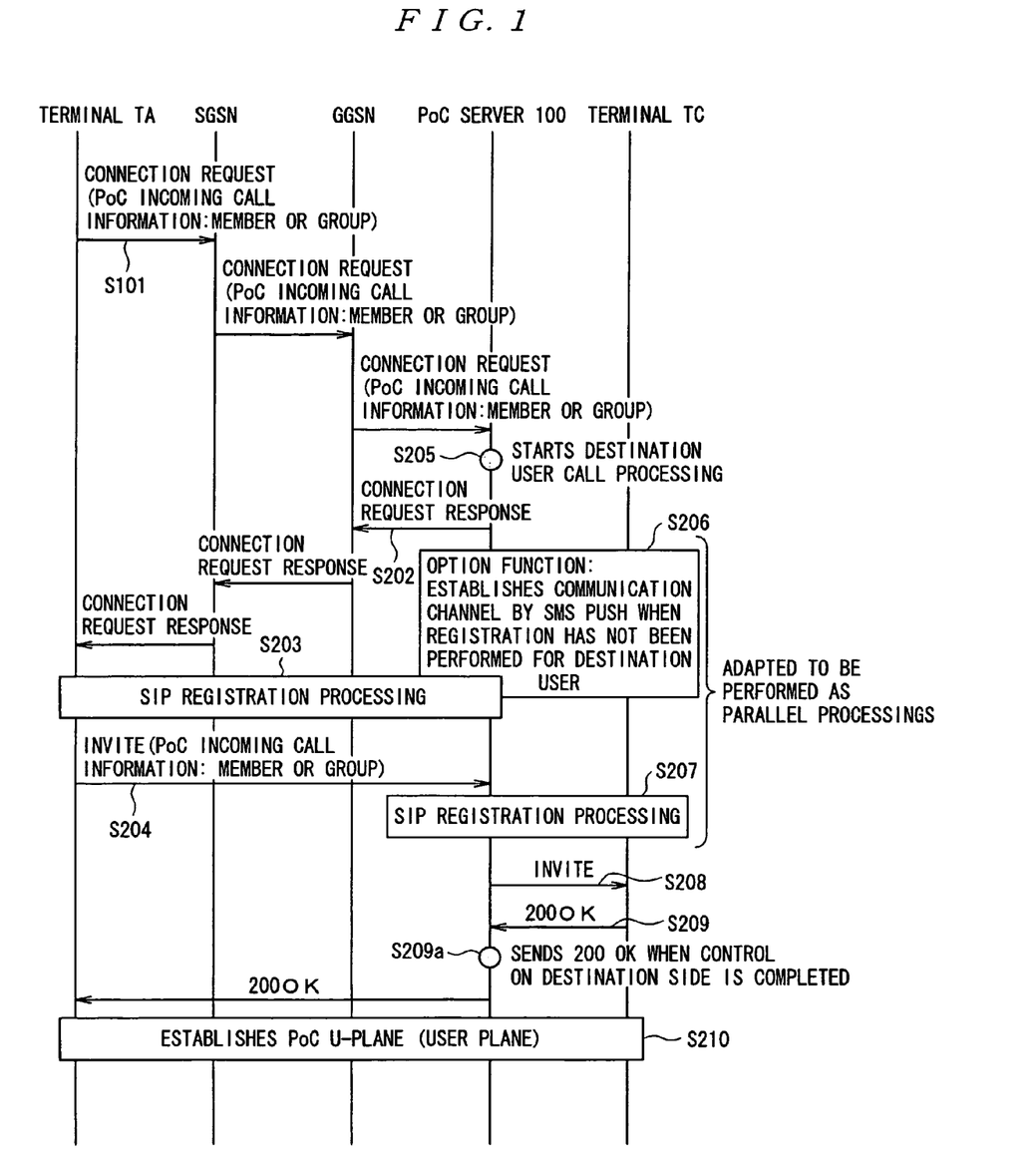
FIG. 1 is a sequence diagram showing the operation of an entire PoC communication system using PoC terminals and a PoC server according to an embodiment of the present invention.

FIG. 1 is a sequence diagram showing the operation of an entire PoC communication system using the PoC terminals and the PoC server according to the embodiment of the present invention. In the operation shown in the figure, a connection request S101 sent from the TA to the PoC server 100 includes PoC incoming call information, that is, information about a member or a group that is going to perform PoC communication, unlike the case in FIG. 12. That is, the terminal TA which sends the connection request S101 extracts signal information to be sent by SIP in advance and sets it on a communication channel establishment signal (such as an Activate PDP context request in GPRS) as additional information.

Receiving this connection request S101, an SGSN or a GGSN extracts the additional information and sequentially transfers the information to the PoC control server. Therefore, the PoC server 100 which has received the connection request S101 including the information can start the destination user call processing immediately after the receiving (S205).

Accordingly, in this embodiment, it is possible to perform sending of a response S202 to the connection request, subsequent Registration processing S203 and processing for receiving an INVITE message S204 in parallel with communication channel establishment processing by SMS Push (S206) and Registration processing S207 for the terminal TC, unlike the case in FIG. 12. Thus, according to the present invention, it is possible to make time required before PoC communication starts shorter than that required in the conventional case shown in FIG. 12.

In the case in FIG. 12, the 200 OK signal S209 received from the terminal TC is immediately sent. However, in this embodiment, the 200 OK signal S209 is sent to the terminal TA only when control on the destination side has been completed at the time of receiving the 200 OK signal S209 (S209a). That is, the PoC server 100 coordinates the transmission and receiving processings to complete the call processing.

(Communication Control Method)

In the PoC communication system described above, the following communication control method is realized. That is, a PoC communication control method is realized which includes: a communication channel establishment request sending step of sending a request for establishing a communication channel to be used for PoC communication (corresponding to S101 in FIG. 1), a call processing step of performing call processing for establishing a communication channel to a terminal other than the terminal which has sent the request immediately after the request is received (corresponding to S205 to S207 in FIG. 1), and a step of performing processing after sending a response to the request, in parallel with the call processing step (corresponding to S202 to S204 in FIG. 1). According to such a PoC communication control method, response to a communication channel connection request, the SIP Registration processing and the Invitation processing on the originating side and the processing on the destination side are performed in parallel, and thereby, connection time can be shortened, and PoC communication can be started early.

(Summary)

In a PoC communication system, SIP call processing is performed on the assumption of establishment of a communication channel (such as GPRS and WLAN). Therefore, if a communication channel has not been established, the SIP call processing is performed after establishing a communication channel by SMS Push or the like, and much time is required before PoC communication starts. However, in the present invention, it is possible to, by overlapping information for the SIP call processing onto a connection request signal for establishing a communication channel, proceed to processing for establishing a communication channel immediately after receiving the connection request signal, and thereby time required before PoC communication starts can be shortened.

Description has been made on a PoC server, a PoC terminal and a PoC communication control method for performing PoC communication. However, these are only examples, and the present invention is applicable to communication such as VoIP and IM (Instant Messaging). That is, by performing call processing for establishing a communication channel to a terminal other than the terminal which has sent the request, immediately after receiving a request for establishing a communication channel used for predetermined communication, and performing processing after sending a response to the request, in parallel with the call processing, connection time can be shortened, and the predetermined communication can be started early.

The present invention is applicable to a PoC communication system, VoIP, IM and other communication systems.

What is claimed is:

1. A PoC (Push-to-talk over Cellular) communication control server for a PoC communication in accordance with SIP (Session Initiation Protocol), the PoC server comprising:

receiving means for receiving a single connection request, from a first communication terminal, for establishing a communication channel to be used for the PoC communication, with a second communication terminal which is a member or with a plurality of communication terminals which is a group, including the second communication terminal, the single connection request including information that allows the first communication terminal to establish the communication channel with the communication control server and also including information that allows the second communication terminal or the plurality of communication terminals including the second communication terminal to establish the communication channel or the communication channels with the communication control server; and call processing means for extracting the information from the single connection request and performing call processing for establishing the communication channel between the communication control server and the second communication terminal or the communication channels between the communication control server and the plurality of communication terminals including the second communication terminal, immediately after the single connection request is received by the receiving means;

wherein processing including: sending a response to the single connection request; performing a SIP registration process of the first communication terminal; and receiving an INVITE message from the first communication terminal is performed, in parallel with the call processing.

2. A communication terminal to be used for a PoC (Push-to-talk over Cellular) communication in accordance with SIP (Session Initiation Protocol), the communication terminal comprising:

a communication unit that sends to a communication control server for the PoC communication a single connection request for establishing a communication channel to be used for the PoC communication with another communication terminal which is a member or with a plurality of communication terminals which is a group, including the another communication terminal, the single connection request including information that allows the communication terminal to establish the communication channel with the communication control server and also including information that allows the another communication terminal or the plurality of communication terminals including the another communication terminal to establish the communication channel or the communication channels with the communication control server so that the communication control server may extract the information from the single connection request and perform call processing for establishing the communication channel between the communication control server and the another communication terminal or the communication channels between the communication control server and the plurality of communication terminals including the another communication terminal, immediately after the single connection request is received by the communication control server;

wherein the communication control server performs processing including: sending a response to the single connection request; performing a SIP registration process of the communication terminal; and receiving an INVITE message from the communication terminal, in parallel with the call processing.

3. A communication control method for a PoC (Push-to-talk over Cellular) communication in accordance with SIP (Session Initiation Protocol), the method comprising:

sending a single connection request from a first communication terminal to a PoC server for establishing a communication channel to be used for the PoC communication with a second communication terminal which is a member or with a plurality of communication terminals which is a group, including the second communication terminal, the single connection request including information that allows the first communication terminal to establish the communication channel with a communication control server and also including information that allows the second communication terminal or the plurality of communication terminals including the second communication terminal to establish the communication channel or the communication channels with the communication control server;

performing call processing for extracting the information from the single connection request and establishing the communication channel between the communication control server and the second communication terminal or the communication channels between the communication control server and the plurality of communication terminals including the second communication terminal, immediately after the single connection request is received; and performing processing including: sending a response to the single connection request; performing a SIP registration process of the first communication terminal; and receiving an INVITE message from the first communication terminal, in parallel with the performing the call processing.

4. The communication control server according to claim 1, wherein the call processing further includes registration processing of registering the second communication terminal or to the plurality of communication terminals including the second communication terminal, in the communication control server.

* * * * *